(12) United States Patent
Guerin et al.

(10) Patent No.: US 12,467,290 B2
(45) Date of Patent: Nov. 11, 2025

(54) VEHICLE DOOR HANDLE ASSEMBLY

(71) Applicant: MINEBEA ACCESSSOLUTIONS ITALIA S.P.A., Pianezza (IT)

(72) Inventors: Anthony Guerin, Pianezza (IT); Guillaume Despreaux, Pianezza (IT); Martin Winker, Pianezza (IT)

(73) Assignee: MINEBEA ACCESSSOLUTIONS ITALIA S.P.A., Pianezza (IT)

( * ) Notice: Subject to any disclaimer, the term of this patent is extended or adjusted under 35 U.S.C. 154(b) by 192 days.

(21) Appl. No.: 18/352,627

(22) Filed: Jul. 14, 2023

(65) Prior Publication Data
US 2024/0018808 A1    Jan. 18, 2024

(30) Foreign Application Priority Data
Jul. 15, 2022   (EP) .................................. 22185290

(51) Int. Cl.
*E05B 85/10* (2014.01)
*E05B 81/76* (2014.01)

(52) U.S. Cl.
CPC ............ *E05B 85/107* (2013.01); *E05B 81/76* (2013.01); *E05B 85/103* (2013.01)

(58) Field of Classification Search
CPC ........ E05B 81/06; E05B 81/76; E05B 85/103; E05B 85/107; E05B 85/16; E05B 85/10
See application file for complete search history.

(56) References Cited

U.S. PATENT DOCUMENTS

| | | | |
|---|---|---|---|
| 5,123,687 A * | 6/1992 | Pfeiffer | E05B 1/0092 292/DIG. 31 |
| 11,391,073 B2 * | 7/2022 | Rhein | E05B 81/90 |
| 11,821,245 B2 * | 11/2023 | Herdering | E05B 81/77 |
| 11,833,949 B2 * | 12/2023 | Paradis | B62D 25/04 |
| 11,939,799 B2 * | 3/2024 | Toyama | E05B 81/06 |
| 12,227,972 B2 * | 2/2025 | Aerts | B60Q 1/2669 |
| 2011/0148575 A1 * | 6/2011 | Sobecki | E05B 5/006 292/336.3 |
| 2014/0022811 A1 | 1/2014 | Wheeler et al. | |
| 2014/0047773 A1 * | 2/2014 | Johnsrud | E05B 85/103 49/460 |

(Continued)

FOREIGN PATENT DOCUMENTS

DE   10 2017 010 196 B3   4/2019
KR      10-2007239 B1      8/2019

*Primary Examiner* — Christine M Mills
*Assistant Examiner* — Faria F Ahmad
(74) *Attorney, Agent, or Firm* — Oblon, McClelland, Maier & Neustadt, L.L.P.

(57) ABSTRACT

A vehicle door handle assembly includes a bracket and a handle, a first extremity of the handle being connected to a first end of a first lever, a second extremity of the handle being connected to a first end of a second lever, the second end of the second lever being connected to a second end of the first lever with at least one rod, the actuator includes an electric motor designed to count its number of steps, and a position sensor is positioned on either a fix element or a mobile element, a detection object being positioned on the other fix or mobile element facing the position sensor, the position sensor and the detection object being positioned in such a way that the position sensor detects the detection object when the handle is in its deployed position.

15 Claims, 4 Drawing Sheets

(56) References Cited

U.S. PATENT DOCUMENTS

Figure 1:
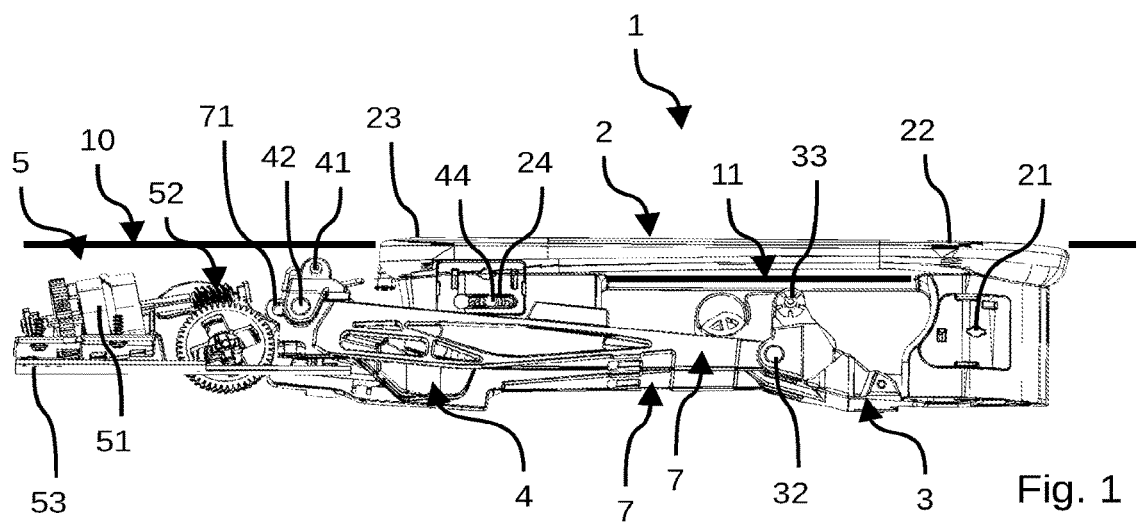

| | | | |
|---|---|---|---|
| 2014/0365080 A1* | 12/2014 | Hirota | E05B 83/40 |
| | | | 701/49 |
| 2017/0089102 A1* | 3/2017 | Yoshino | E05B 79/22 |
| 2017/0275930 A1* | 9/2017 | Aerts | E05B 81/54 |
| 2018/0171686 A1* | 6/2018 | Couto Maquieira | E05B 85/107 |
| 2020/0087955 A1* | 3/2020 | Chen | E05B 85/107 |
| 2021/0002928 A1 | 1/2021 | Toyama et al. | |
| 2021/0071450 A1* | 3/2021 | Guerin | E05B 81/06 |
| 2021/0156178 A1 | 5/2021 | Heyduck et al. | |
| 2021/0172216 A1* | 6/2021 | Savant | B60R 16/0239 |
| 2021/0230905 A1* | 7/2021 | Loon | E05C 3/042 |
| 2022/0106818 A1* | 4/2022 | Velicanin | B60J 5/0468 |
| 2022/0364399 A1* | 11/2022 | Yang | E05B 81/76 |
| 2022/0372798 A1* | 11/2022 | Gröver | E05B 81/06 |
| 2022/0403684 A1* | 12/2022 | Gröver | E05B 81/76 |
| 2023/0112553 A1* | 4/2023 | Moriyama | E05B 85/107 |
| | | | 292/336.3 |
| 2023/0417090 A1* | 12/2023 | Guerin | E05C 19/022 |

\* cited by examiner

VEHICLE DOOR HANDLE ASSEMBLY

TECHNICAL FIELD

The present invention relates to a vehicle door handle assembly, in particular of the type with a handle translating from a rest position where the handle is retracted and a deployed position where the handle is deployed and can be taken in hand and opened.

BACKGROUND

Such vehicle door handle assemblies have generally three positions: a rest position where the handle is retracted and flush with the vehicle door body, a deployed position where the handle steps out of the vehicle door body and an opening position where the handle is pulled by a user in order to unlock and open the vehicle door. Such vehicle door handle assemblies with a handle translating between its rest position and its deployed position is becoming more common and requested by manufacturers.

In order to translate the handle between its two positions, such vehicle door handle assemblies are motorized by an electric actuator. These motorized vehicle door handle assemblies are complex and require to determine the position of the handle and to control the translation of the handle. Furthermore, some manufacturers have in their specifications to detect precisely the position of the handle, especially when said handle is in its deployed position. This precise detection of the position of the handle is requested to detect any tiny movements of the handle, for example if the handle is slightly pulled by the user but not completely pulled to open the vehicle door.

However, this precise detection of the handle position requires several sensors increasing the cost and the complexity of the vehicle door handle assembly.

One aim of the present invention is to provide an economic and simple motorized vehicle door handle assembly which is able to precisely detect the handle position.

To this end, the invention relates to a vehicle door handle assembly comprising a bracket and a handle, said handle comprising a first extremity and a second extremity opposed to the first extremity, the first extremity of the handle being connected to a first end of a first lever, said first lever being designed to be connected to an opening lever to open a latch of the vehicle door, said first lever being designed to rotate between a rest position where the first extremity of the handle is in a rest position, a deployed position where the first extremity of the handle is in a deployed position outside the bracket and an opening position where the first lever actuates the opening lever, wherein an actuator rotate the first lever or a second lever between a rest position and a deployed position, wherein the actuator comprises an electric motor designed to count its number of steps, and wherein a position sensor is positioned on either a fix element or a mobile element, a detection object being positioned on the other fix or mobile element facing the position sensor, the position sensor and the detection object being positioned in such a way that the position sensor detects the detection object when the handle is in its deployed position.

Preferably, the position sensor is a hall effect sensor and the detection object is a magnet. Thus, the hall effect sensor is positioned on either a fix element or a mobile element, the magnet being positioned on the other fix or mobile element facing the hall effect sensor, the hall effect sensor and the magnet being positioned in such a way that the hall effect sensor detects the magnet when the handle is in its deployed position.

Alternatively, the position sensor can be any sensor that is feasible for the application, in particular a capacitive sensor or a light sensor, and the detection object can be a metallic strip or a reflector.

The second extremity of the handle may be connected to a first end of a second lever, said second lever being designed to rotate between a rest position where the second extremity of the handle is in a rest position and a deployed position where the second extremity of the handle is in a deployed position outside the bracket, a second end of the second lever being connected to an actuator to rotate the second lever between its rest position and its deployed position, the second end of the second lever being connected to a second end of the first lever with at least one rod.

The position sensor may be positioned on a fix element and the detection object is positioned on a mobile element.

The detection object may be positioned on the at least one rod.

The detection object may be positioned on the first lever or the second lever.

The position sensor may be positioned on the bracket.

The position sensor may be positioned within the actuator.

The electric motor may be linked to a printed circuit board and the position sensor may be positioned on the same printed circuit board.

The position sensor and the detection object may be positioned on the back of the vehicle door handle assembly at the opposite of the handle.

The position sensor and the detection object may be positioned on a side of the vehicle door handle assembly.

The electric motor may be a brushless direct current electric motor.

The electric motor may be a sensorless brushless direct current electric motor.

The vehicle door handle assembly may also comprise a sensor measuring the angle of the output shaft of the electrical motor.

The present invention also concerns a method of correction the handle position of a vehicle door handle assembly, said method comprising:

a first step of position startup of the handle where the handle is attempted to be moved to a desired position, If the handle is stopped due to its arrival in the desired position, the counter of steps of the electrical motor is checked:

If the number of steps of the electrical motor and the value of the detection by the position sensor are as expected within the tolerance, then the state of the handle is saved, If the number of steps of the electrical motor is not corresponding to the value of the detection by the position sensor, then, the number of steps of the electrical motor is adjusted to the expected value, then the state of the handle is saved, If the handle is expected to be in one of its extremal positions and the number of steps of the electrical motor is not corresponding to the expected value at this extremal position, then, the number of steps of the electrical motor is adjusted to the expected value, then the state of the handle is saved, After the state of the handle is saved, the handle rests in position until a command, is transmitted to the electrical motor by the electronic command unit of the vehicle, then, the cycle of the method of correction could start again, if necessary, at its first step.

When the handle is expected to be in one of its extremal positions, if the value of the angle measured by the output shaft sensor is different of an expected value, this value of the angle could be adjusted to the expected value in order to calibrate the sensor.

Figure 2:
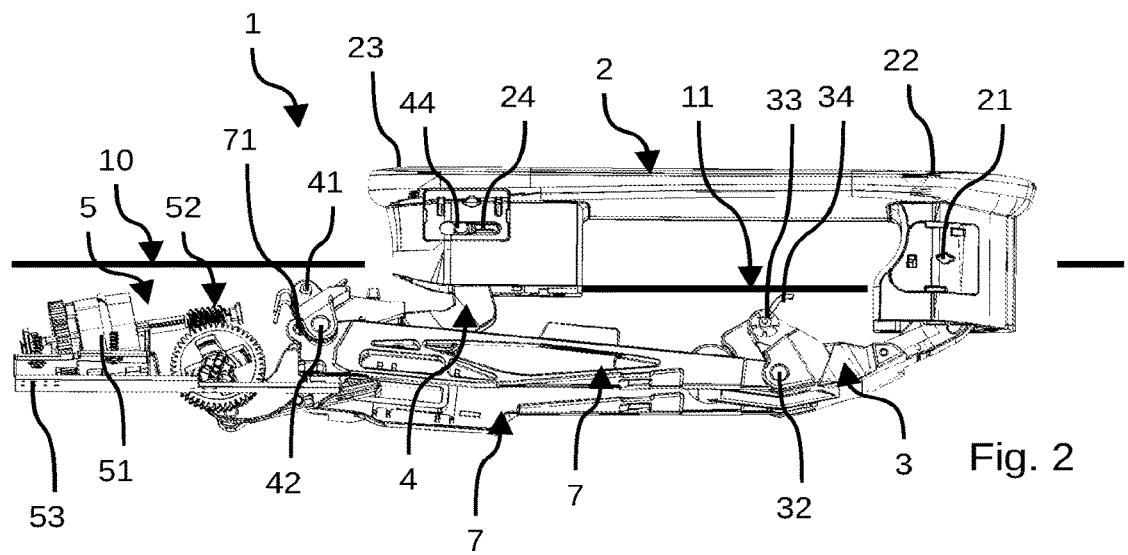
Figure 3:
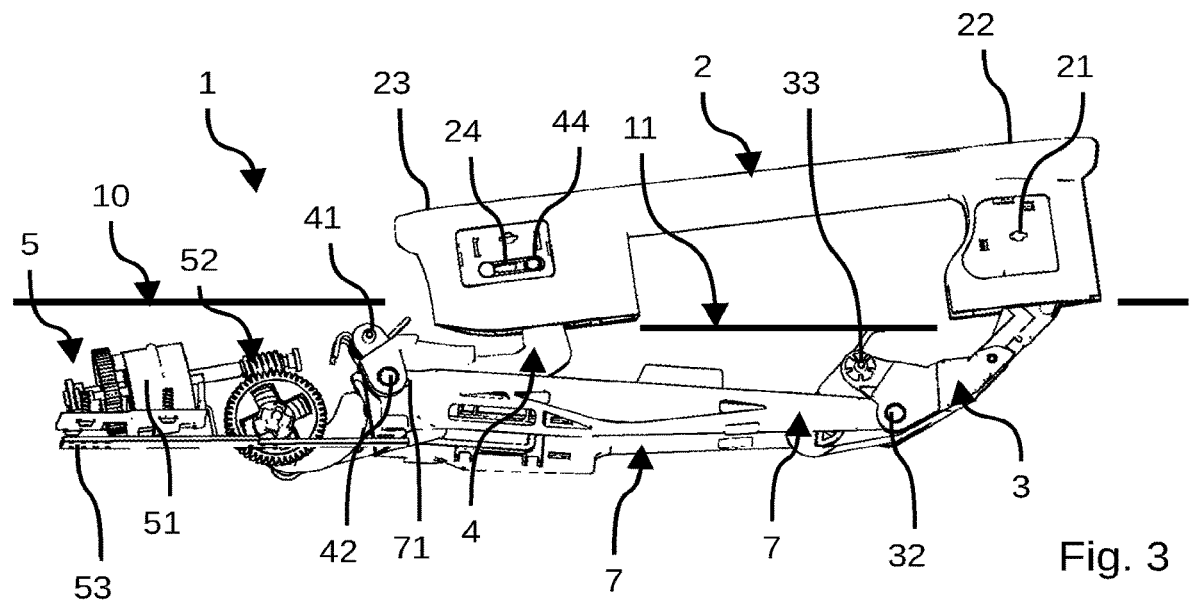
Figure 4:
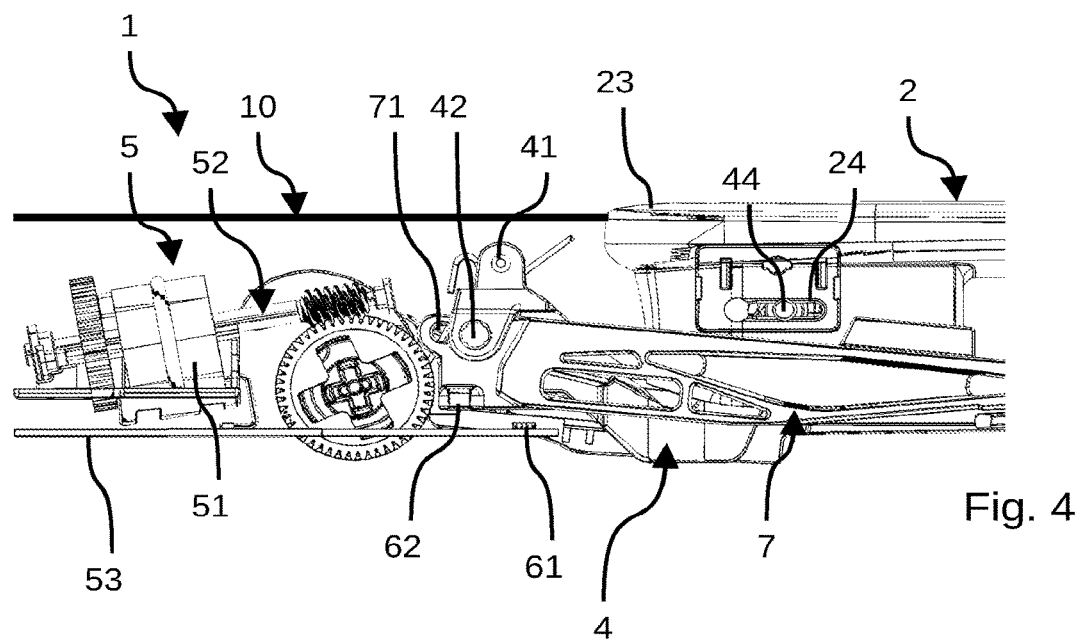
Figure 5:
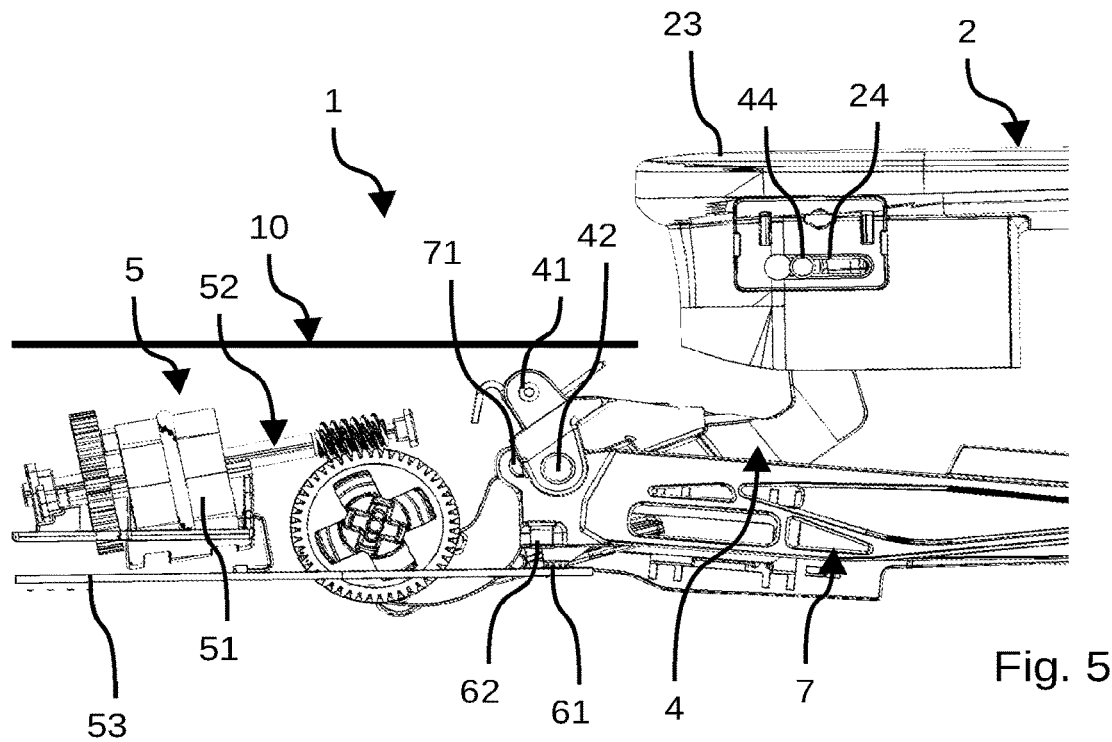
Figure 6:
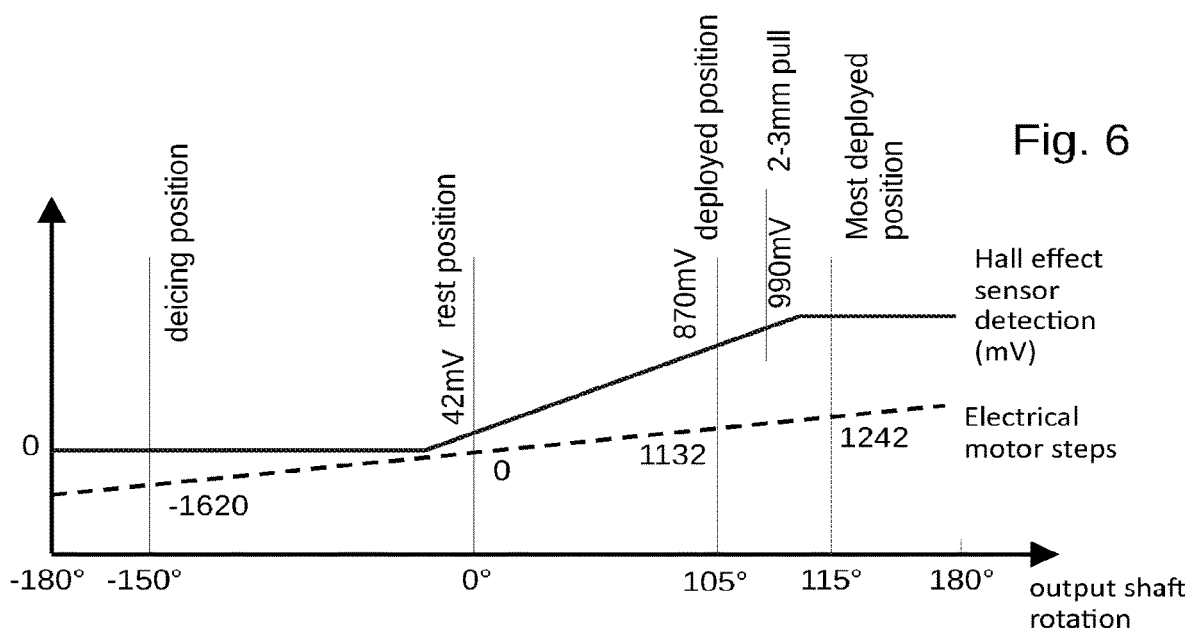
Figure 7:
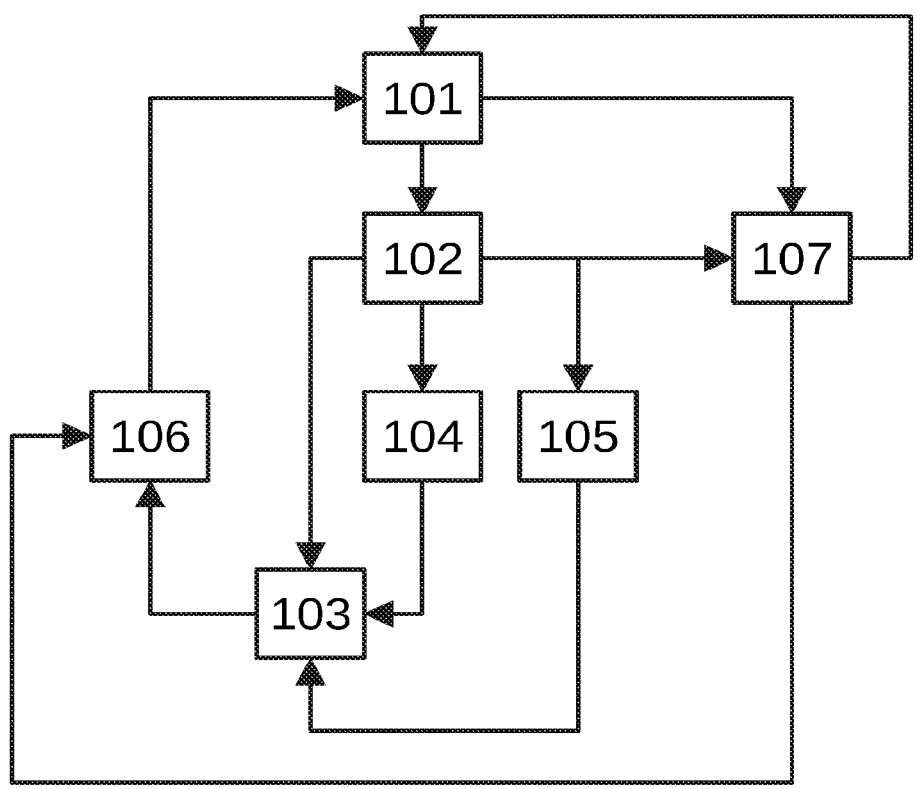

Further features and advantages of the invention will become apparent from the following description, given by way of non-limiting example, with reference to the appended drawings, in which:

FIG. 1 is a side view of a schematic representation of a vehicle door handle assembly in a rest position, FIG. 2 is a side view of a schematic representation of a vehicle door handle assembly in a deployed position, FIG. 3 is a side view of a schematic representation of a vehicle door handle assembly in an opening position, FIG. 4 is a side view of the vehicle door handle assembly in a rest position of FIG. 1 zoomed on a position detection sensor, FIG. 5 is a side view of the vehicle door handle assembly in a deployed position of FIG. 2 zoomed on a position detection sensor, FIG. 6 is a graph representing the evolution of the counting of steps by the electrical motor and the detection by the position sensor in different positions of the handle FIG. 7 is a diagram of the method of correction of position the handle and/or the count of the steps of the electrical motor.

In these figures, identical elements bear the same reference numbers. The following implementations are examples. Although the description refers to one or more embodiments, this does not necessarily mean that each reference relates to the same embodiment or that the features apply only to a single embodiment. Individual features of different embodiments can also be combined or interchanged to provide other embodiments.

SUMMARY OF INVENTION

FIG. 1 shows a vehicle door handle assembly 1 in a rest position. The vehicle door handle assembly 1 comprises a bracket 10 and a handle 2. The bracket 10 is designed to be fixed on the vehicle door (not represented). In this rest position, the handle 2 is retracted into the bracket 10 in order to be at the same level of the door body when installed.

The handle 2 comprises a first extremity 22 and a second extremity 23 opposed to the first extremity 22. The first extremity 22 of the handle 2 is connected to a first lever 3 and the second extremity 23 of the handle 2 is connected to a second lever 4.

The first lever 3 is also designed to be connected to an opening lever (not represented) to open a latch of the vehicle door. The first lever 3 is designed to rotate between a rest position (represented in FIG. 1) where the first extremity 22 of the handle 2 is in a rest position, a deployed position (represented in FIG. 2) where the first extremity 22 of the handle 2 is in a deployed position outside the bracket 10 and an opening position (represented on FIG. 3) where the first lever 3 actuates the opening lever.

More precisely, the first lever 3 comprises a pivot connection 33 with the bracket 10 around which the first lever 3 rotates between its different positions. A first extremity of the second lever 3 is connected to the first extremity 22 of the handle 2 and a second extremity of the second lever 3, is connected to the opening lever. The first lever 3 may also comprises an elastic mean 34 (visible on FIG. 2) passively bringing back said first lever 3 from its open position to its deployed position. This elastic mean 34 may be a spring positioned for example on the pivot connection 33 between the first lever 3 and the bracket 10.

The second extremity 23 of the handle 2 is connected to a second lever 4. The second lever 4 is designed to rotate between a rest position (represented in FIG. 1) where the second extremity 23 of the handle 2 is in a rest position, and a deployed position (represented in FIGS. 2 and 3) where the second extremity 23 of the handle 2 is in a deployed position outside the bracket 10. The second lever 4 comprises a pivot connection 41 with the bracket 10 around which the second lever 4 rotates between its different positions. A first extremity of the second lever 4 is connected to the second extremity 23 of the handle 2.

The connections between the first lever 3 and the first extremity 22 of the handle 2 and between the second lever 4 and the second extremity 23 of the handle 2 comprise preferably a pivot-slide connection and a pivot connection. In the examples represented in FIGS. 1 to 3, the connection between the second lever 4 and the second extremity 23 of the handle 2 is pivot-slide connection The second extremity 23 of the handle 2 comprises here a recess 24 and the second lever 4 comprises a slide opening 44 for example to receive a pin (not represented). The connection between the first lever 3 and the first extremity 22 of the handle is here a pivot connection 21.

The first 3 and second 4 levers may be connected together with at least one rod 7 in order to synchronize the movements of the two levers 3, 4. More exactly, the rod 7 transmits the rotation of the second lever 4 from its rest position to its deployed position to the first lever 3, rotating said first lever 3 from its rest position to its deployed position. The rod 7 may comprise a pivot-slide connection with any of the first 3 or second lever 4 so that the first lever 3 can rotate from its rest position to its deployed position or from its deployed position to its opening position without rotate the second lever 4. In the example illustrated in FIGS. 1 to 3, the rod 7 comprises a first extremity connected to a second extremity of the first lever 3 by a pivot connection 32. The rod 7 comprises a second extremity connected to the second lever 4 by a pivot-slide connection. The second extremity of the rod 7 comprises a slide opening 71 and the second extremity of the second lever 4 comprises a pin 42 inserted into said slide opening 71. The handle 2, the first lever 3, the second 4 lever and the rod 7 are designed and connected like a parallelogram and move together synchronously. The other connection of the rod 7 with any of the first 3 or second lever 4 is preferably a pivot connection.

The vehicle door handle assembly 1 also comprises an actuator 5 connected to the second lever 4 in order to rotate the second lever 4 between its rest position and its deployed position. The actuator 5 comprises an electric motor 51 in order to pull or push the second lever 4 according to the direction of rotation of said electric motor 51. The actuator 5 may also comprise a slider-crank linkage 52 in order to convert the rotational movement of the electric motor 51 into a linear movement. The slider-crank linkage 52 may be connected directly to a second end of the second lever 4 or connected to any of the at least one rod 7. The actuator 5 is preferably installed into a housing (not represented).

The FIGS. 1 to 3 represent the different positions and cinematic steps of the deployment and retraction of the handle 2.

As described above, FIG. 1 is a representation of a rest position where the handle 2 is retracted into the bracket 10 in order to be at the same level of the door body when installed. The first lever 3 and the second lever 4 are in their rest position. These two levers 3 and 4 are maintained in in their rest position due to the actuator 5. In this rest position, the inside of the handle 2 may also rest on a rest portion 11 of the bracket 10 placed between the first 22 and second 23 extremities of the handle 2.

FIG. 2 represents a deployed position of the handle 2 where the first lever 3 and the second lever 4 are in their deployed position. These two levers 3 and 4 are maintained in their deployed position due to the actuator 5. This deployed position of the handle 2 is generally not the most deployed position the handle 2 could have.

FIG. 3 represents an opening position of the handle 2 where the user can grab the handle 2 and pull it in order to open the vehicle door. When the user pulls the handle 2, it rotates around the pivot connection 21 between the first extremity 22 of the handle 2 and the first lever 3. The first extremity 22 of the handle 2 is pulled in an opening position rotating the first lever 3 from its deployed position to its opening position. The rotation of the first lever 3 is not transmitted to the second lever 4 by the rod 7 due to the pivot-slide connection. When the user releases the handle 2, the first lever 3 rotates back to its deployed position due to its elastic mean 34.

In addition of the rest position, the deployed position and the opening position, the handle 2 could have a deicing position. This deicing position is a position in which, from the rest position, the handle 2 is temporarily retracted inside the bracket 10 in order to break the ice in cold environment. Generally, the deicing position corresponds to an extremal position of the handle 2 where the handle is most retracted in the frame.

The deicing position is performed only when it is detected by a position sensor 61, in particular a hall effect sensor 61, that the handle is not moved to the desired position.

As shown on FIGS. 4 and 5, the vehicle door handle assembly 1 also comprises a position sensor 61, in particular a hall effect sensor 61 associated with a detection object, in particular a magnet 62. The hall effect sensor 61 is positioned on either a fix element 53, 10 or a mobile element 7, 3, 4. The magnet 62 is positioned on the other fix 53, 10 or mobile 7, 3, 4 element facing the hall effect sensor 61. The hall effect sensor 61 and the magnet 62 are positioned in such a way that the hall effect sensor 61 detects for example the magnet 62 when the handle 2 is in its deployed position.

By fix element 53, 10, it is meant an element of the vehicle door handle assembly 1 which does not move with respect to the bracket 10 during the movements of the handle 2 between its different positions. On the contrary, a mobile element (7, 3, 4) is an element of the vehicle door handle assembly which moves with respect to the bracket 10 during the movements of the handle 2 between its different positions.

The hall effect sensor 61 is preferably positioned on a fix element 53, 10 and the magnet 62 is positioned on a mobile element 7, 3, 4. This particular embodiment permits an easier electric connection of the hall effect sensor 61. However, it is perfectly possible to inverse these positions and to place the hall effect sensor 61 on a mobile element 7, 3, 4 and to place the magnet 62 on a fix element 53, 10.

In the example illustrated on FIGS. 4 and 5, the magnet 62 is positioned on a mobile element 7, 3, 4, more precisely on the at least one rod 7. The magnet 62 could also be positioned on another mobile element such as any of the first lever 3 or the second lever 4.

Still according to the example illustrated on FIGS. 4 and 5, the hall effect sensor 61 is positioned within the actuator 5. The actuator 5 could comprise a printed circuit board 53 on which the hall effect sensor 61 is directly connected. This printed circuit board 53 could comprise the electronic components permitting connection of the hall effect sensor 61 with for example the electronic control unit (ECU) of the vehicle and its power supply. In another example not represented, the hall effect sensor 61 could be positioned on the bracket 10. The printed circuit board 53 could also be connected to the electric motor 51 in order to permit the connection of the electric motor 51 with for example the electronic central unit (ECU) of the vehicle and its power supply. Thus, the hall effect sensor 61 could be directly installed on the same printed circuit board 53 than the electric motor 51. Furthermore, the hall effect sensor 61 could be protected under the housing of the actuator 5.

As represented in the example illustrated on FIGS. 4 and 5, the hall effect sensor 61 and the magnet 62 could be positioned on the back of the vehicle door handle assembly 1 on the opposite side of the handle 2. By the back of the vehicle door handle assembly 1, we mean the face of the vehicle door handle assembly 1 opposed to a front face of the vehicle door handle assembly 1 where the handle 2 can translate out of the bracket 10. On another example not represented, the hall effect sensor 61 and the magnet 62 could be positioned on a side of the vehicle door handle assembly 1. By a side of the vehicle door handle assembly 1 we mean a face of the of the vehicle door handle assembly 1 connecting the front face and the back face of the vehicle door handle assembly 1.

The hall effect sensor 61 could be for example a switch hall effect sensor, a linear hall effect sensor or a 3D hall effect sensor. These different types of hall effect sensors have different resolutions and minimal measurable movement suitable on the handle for different applications.

For example, a switch hall effect sensor could have a total resolution of 0.72 mm which may correspond for a minimal measurable movement on the handle about 2.13 mm. A linear hall effect sensor could have a total resolution of 0.42 mm which may correspond for a minimal measurable movement on the handle about 1.24 mm. Due to the great minimal measurable movement on the handle, these two hall effect sensors could be used for example to detect a close or open position for elements like charge port door, for spoilers and flaps or for functional safety where the accuracy is not essential.

For a 3D hall effect sensor, the total resolution could be about 0.18 mm which may correspond for a minimal measurable movement on the handle about 0.53 mm. This type of hall effect sensor is accurate and could be used to measure tiny movements of the handle. Furthermore, such a 3D hall effect sensor can measure the complete path of the handle 2 between its rest position to its deployed position and also in case of a pulling of the handle beyond its deployed position.

Furthermore, the switch and linear hall effect sensors require an air gap accuracy about 2 mm with a margin of plus or minus 0.05 mm. This air gap corresponds to the distance between the magnet 62 and the hall effect sensor 61 when the magnet 62 is facing the hall effect sensor 61 in the deployed position of the handle 2. A 3D hall effect sensor requires an air gap accuracy about 2 mm with a margin of plus or minus 0.8 mm which is easier to obtain and maintain in a vehicle door handle assembly 1.

The electric motor 51 is designed to count its number of steps. For example, the electric motor 51 could be a brushless direct current electric motor. More precisely, the electric motor 51 could be a sensorless brushless direct current electric motor. An electric motor 51 designed to count its number of steps can determine the position of the handle 2 and whether it is in its rest or deployed position. This brushless direct current electric motor could have twelve poles corresponding to six pole pairs. This electric motor 51 could have for example 3888 steps per output rotation. In order to control precisely the electrical motor 51, a scanning of the back electromotive force (BEMF) could be performed.

In combination with the hall effect sensor 61 and the magnet 62, when the handle 2 is in its deployed position, it is possible to detect any tiny movement of the handle 2, for example if the handle 2 is slightly pulled or pushed by the user. These tiny movements would normally not be detected by the electric motor 51 due to the clearance between the different mechanical parts of the vehicle door handle assembly 1. These tiny movements could be for example a pull of the handle 2 when it is in its deployed position about 2 or 3 mm. If the magnet 62 is positioned on the at least one rod 7, when the handle 2 pass from its rest position to its deployed position, corresponding for example of a 30 mm move of the handle, the magnet 62 may move about 10.2 mm. A movement of the handle 2 in its deployed position can lead to a movement of the magnet 62 around 1 mm or less relative to the hall effect sensor 61. For example, if the handle is pulled 2 or 3 mm, the magnet 62 may move about 1 mm more. This movement of the magnet 62 can thus be detected by the hall effect sensor 61. A response to this tiny movement can thus be programed in the electronic control unit according to the requirements of the manufacturer.

The FIG. 6 shows a graph of the evolution of the number of steps of the electric motor and the hall effect sensor 61 detection in the different positions of the handle 2. The different positions of the handle 2 are represented by the angle of the output shaft of the electrical motor 51. The angle of the output shaft could be known by a dedicated sensor.

In the graph of FIG. 6, the initial position corresponds to the rest position of the handle. In this initial position, the number of steps of the electrical motor 51 is set to 0 and the angle of the output shaft is set to 0°. In this initial position, the magnet 62 may be in the range of detection the hall effect sensor 61 with for example a voltage of 42 mV emitted by the hall effect sensor 61.

In the deicing position, the output shaft may have rotated about −150° form the initial position. The electric motor 51 may have turned for example about −1620 steps. The magnet 62 may be out the range of detection the hall effect sensor 61 and no voltage is emitted by the hall effect sensor 61.

In the deployed position, the output shaft may have rotated about 1050 form the initial position. The electric motor 51 may have turned for example about 1132 steps. The magnet 62 may be in the range of detection the hall effect sensor 61 with for example a voltage of 870 mV emitted by the hall effect sensor 61.

In case of a 2-3 mm pull of the handle 2 from its deployed position, the play between the different mechanical elements of the vehicle door handle assembly 1 may increase the difficulty to know the exact position of the handle 2 by the count of the steps of the electrical motor 51. However, this 2-3 mm pull can be detected by the tiny movement of the magnet 62 and the hall effect sensor 61 may for example emit a voltage of 990 mV.

At the most deployed position of the handle 2, the output shaft may have rotated about 115° form the initial position. The electric motor 51 may have turned for example 1242 steps. The magnet 62 may be out the range of detection the hall effect sensor 61 and no voltage is emitted by the hall effect sensor 61.

The deicing position, the rest position and the deployed position, could be use also to perform the calibration of the handle 2 position and the electrical motor 51.

The position the handle 2 and/or the count of the steps of the electrical motor 51 could be corrected according to a method illustrated by a diagram on FIG. 7.

The first step of the method of correction is a position startup of the handle 2 as represent by a first block diagram 101 where the handle 2 is attempted to be moved to a desired position.

If the handle 2 is stopped due to its arrival in the desired position, the counter of steps of the electrical motor 51 is checked, as represented by a second block diagram 102.

If the handle 2 is in the desired position and the number of steps of the electrical motor 51 and the value of the detection by the hall effect sensor 61 are as expected within the tolerance, the state of the handle 2 is saved, for example in the electronic command unit of the vehicle, as represent by a third block diagram 103. This state of the handle 2 is more precisely characterized by the number of steps of the electrical motor 51, the value of the detection by the hall effect sensor 61 and eventually also by the measured angle of the output shaft of the electrical motor 51.

If the handle 2 is expected to be in its deployed position or its rest position, but the number of steps of the electrical motor 51 is not corresponding to the value of the detection by the hall effect sensor 61. Then, the number of steps of the electrical motor 51 is adjusted to the expected value as represented by a fourth bloc diagram 104. When the correction is done, the state of the handle 2 is saved, for example in the electronic command unit of the vehicle, as represent by the third block diagram 103.

If the handle 2 is expected to be in one of its extremal positions, the most retracted or the most deployed position, the handle 2 is blocked mechanically. As shown in the graph of FIG. 6, in these extremal positions, the magnet 62 is out of the range of detection of the hall effect senor 61. Then, if the number of steps of the electrical motor 51 is not corresponding to the expected value at this extremal position, the number of steps of the electrical motor 51 is adjusted to the expected value as represented by a fifth bloc diagram 105. Eventually, if the value of the angle measured by the output shaft sensor is different of an expected value, this value of the angle could also be adjusted to the expected value in order to calibrate the sensor. When the correction is done, the state of the handle 2 is saved, for example in the electronic command unit of the vehicle, as represent by the third block diagram 103.

After the state of the handle 2 is saved, the handle 2 rests in position until a command, for example a local interconnect network (LIN) command, is transmitted to the electrical motor 51 by the electronic command unit of the vehicle, as represented by a fifth bloc diagram 106. This command could be for example the translation of the handle 2 to another of its positions.

Then, the cycle of the method of correction could start again, if necessary, at its first step represented by the first block diagram 101.

If, after the position startup of the handle 2, the handle 2 is blocked in an unexpected position or if, after the counter of steps of the electrical motor 51 is checked, a deicing is necessary, an error handling step is performed as represented in a seventh bloc diagram 107.

If the error could be solved directly, for example by a command unit of the electrical motor 51, the cycle of the method of correction could start again, if necessary, at its first step represented by the first block diagram 101

If the error could not be solved directly, a report of the error is sent to the electronic command unit of the vehicle. Therefore, the handle 2 rests in position until a command, for example a local interconnect network (LIN) command to solve the error, is transmitted to the electrical motor 51 by the electronic command unit of the vehicle as represented by the fifth bloc diagram 106. Then, the cycle of the method of correction could start again, if necessary, at its first step represented by the first block diagram 101.

LIST OF REFERENCES

1: vehicle door handle assembly
10: bracket
11: rest bracket
2: handle
21: pivot of the first extremity of the handle
22: first extremity of the handle
23: second extremity of the handle
24: slide opening of the second extremity of the handle
3: first lever
32: pivot connection of the first lever with the rod
33: pivot connection of the first lever with bracket
34: elastic mean
4: second lever
41: pivot connection of the second lever with the bracket
42: pivot connection of the second lever with the rod
44: pivot of the second lever with the slide of the second extremity of the handle
5: actuator
51: electric motor
52: slider-crank linkage
53: printed circuit board
61: position sensor/hall effect sensor
62: detection object/magnet
7: rod
71: slide of the rod

The invention claimed is:

1. A vehicle door handle assembly comprising a bracket and a handle, said handle comprising a first extremity and a second extremity opposed to the first extremity,
    the first extremity of the handle being connected to a first end of a first lever, said first lever being designed to be connected to an opening lever to open a latch of the vehicle door, said first lever being designed to rotate between a rest position where the first extremity of the handle is in a rest position, a deployed position where the first extremity of the handle is in a deployed position outside the bracket and an opening position where the first lever actuates the opening lever,
    wherein an actuator rotate the first lever or a second lever between a rest position and a deployed position, wherein the actuator comprises an electric motor designed to count its number of steps, and wherein a position sensor is positioned on a fix element, a detection object being positioned on a mobile element facing the position sensor, the position sensor and the detection object being positioned in such a way that the position sensor detects the detection object when the handle is in its deployed position,
    wherein the second extremity of the handle is connected to a first end of the second lever, said second lever being designed to rotate between a rest position where the second extremity of the handle is in a rest position and a deployed position where the second extremity of the handle is in a deployed position outside the bracket, a second end of the second lever being connected to the actuator to rotate the second lever between its rest position and its deployed position,
    the second end of the second lever being connected to a second end of the first lever with at least one rod.

2. The vehicle door handle assembly according to claim 1, wherein the position sensor is a hall effect sensor and the detection object is a magnet.

3. The vehicle door handle assembly according to claim 1, wherein the detection object is positioned on the at least one rod.

4. The vehicle door handle assembly according to claim 1, wherein the detection object is positioned on the first lever or the second lever.

5. The vehicle door handle assembly according to claim 1, wherein the position sensor is positioned on the bracket.

6. The vehicle door handle assembly according to claim 1, wherein the position sensor is positioned within the actuator.

7. The vehicle door handle assembly according to claim 6, wherein the electric motor is linked to a printed circuit board and wherein the position sensor is positioned on the same printed circuit board.

8. The vehicle door handle assembly according to claim 1, wherein the position sensor and the detection object are positioned on the back of the vehicle door handle assembly at the opposite of the handle.

9. The vehicle door handle assembly according to claim 1, wherein the position sensor and the detection object are positioned on a side of the vehicle door handle assembly.

10. The vehicle door handle assembly according to claim 1, wherein the electric motor is a brushless direct current electric motor.

11. The vehicle door handle assembly according to claim 1, wherein the electric motor is a sensorless brushless direct current electric motor.

12. The vehicle door handle assembly according to claim 1, wherein said vehicle door handle assembly also comprises a sensor measuring the angle of the output shaft of the electrical motor.

13. A method of correction the handle position of a vehicle door handle assembly according to claim 1, said method comprising:
    a first step of position startup of the handle where the handle is attempted to be moved to a desired position,
    if the handle is stopped due to its arrival in the desired position, a counter of steps of the electrical motor is checked:
    if a number of steps of the electrical motor and a value of the detection by the position sensor are as expected within a tolerance, then the current state of the handle is saved,
    if the number of steps of the electrical motor is not corresponding to the value of the detection by the position sensor, then, the number of steps of the electrical motor is adjusted to an expected value, then the state of the handle is saved,
    if the handle is expected to be in one of its extremal positions and the number of steps of the electrical motor is not corresponding to an expected value at this extremal position, then, the number of steps of the electrical motor is adjusted to the expected value, then the current state of the handle is saved, after the state of the handle is saved, the handle rests in position until a command, is transmitted to the electrical motor by an electronic command unit of the vehicle, then, the cycle of the method of correction could start again, if necessary, at its first step.

14. The method of correction the handle position of a vehicle door handle assembly according to claim 13, wherein said vehicle door handle assembly further comprises a sensor measuring the angle of the output shaft of the electrical motor, and wherein when the handle is expected to be in one of its extremal positions, if the value of the angle measured by the output shaft sensor is different of an expected value, this value of the angle could be adjusted to the expected value in order to calibrate the sensor.

15. A vehicle door handle assembly comprising a bracket and a handle, said handle comprising a first extremity and a second extremity opposed to the first extremity, the first extremity of the handle being connected to a first end of a first lever, said first lever being designed to be connected to an opening lever to open a latch of the vehicle door, said first lever being designed to rotate between a rest position where the first extremity of the handle is in a rest position, a deployed position where the first extremity of the handle is in a deployed position outside the bracket and an opening position where the first lever actuates the opening lever, wherein an actuator rotate the first lever or a second lever between a rest position and a deployed position, wherein the actuator comprises an electric motor designed to count its number of steps, and wherein a position sensor is positioned a mobile element, a detection object being positioned on a fix element facing the position sensor, the position sensor and the detection object being positioned in such a way that the position sensor detects the detection object when the handle is in its deployed position, wherein the second extremity of the handle is connected to a first end of the second lever, said second lever being designed to rotate between a rest position where the second extremity of the handle is in a rest position and a deployed position where the second extremity of the handle is in a deployed position outside the bracket, a second end of the second lever being connected to the actuator to rotate the second lever between its rest position and its deployed position, the second end of the second lever being connected to a second end of the first lever with at least one rod.

* * * * *